US007615901B2

United States Patent
Park

(10) Patent No.: US 7,615,901 B2
(45) Date of Patent: Nov. 10, 2009

(54) SLIM TYPE VIBRATION MOTOR

(75) Inventor: Young Il Park, Gwangsan-gu (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/088,214

(22) PCT Filed: Sep. 27, 2006

(86) PCT No.: PCT/KR2006/003858

§ 371 (c)(1),
(2), (4) Date: Mar. 26, 2008

(87) PCT Pub. No.: WO2007/037622

PCT Pub. Date: Apr. 5, 2007

(65) Prior Publication Data

US 2008/0246356 A1 Oct. 9, 2008

(30) Foreign Application Priority Data

Sep. 27, 2005 (KR) .................. 10-2005-0090032

(51) Int. Cl.
H02K 7/06 (2006.01)
(52) U.S. Cl. .................. 310/81; 310/208
(58) Field of Classification Search .......... 310/81, 310/208, DIG. 6
See application file for complete search history.

(56) References Cited

U.S. PATENT DOCUMENTS

| 4,636,677 | A  | * | 1/1987  | Yasuhara ............... 310/194 |
| 5,175,459 | A  | * | 12/1992 | Danial et al. ........... 310/81  |
| 6,573,627 | B2 | * | 6/2003  | Sun ..................... 310/81   |
| 6,734,594 | B2 |   | 5/2004  | Lee et al.                       |
| 6,806,603 | B1 |   | 10/2004 | Choi et al.                      |
| 6,836,039 | B2 |   | 12/2004 | Choi et al.                      |
| 6,998,742 | B2 | * | 2/2006  | Yamaguchi et al. ...... 310/81   |
| 7,352,093 | B2 |   | 4/2008  | Kim                              |

* cited by examiner

Primary Examiner—Dang D Le
(74) Attorney, Agent, or Firm—Saliwanchik, Lloyd & Saliwanchik

(57) ABSTRACT

A slim type vibration motor is provided. The slim type vibration motor includes a case, a shaft, a rotor, a printed circuit board, and a plurality of coils. The shaft has at least one end thereof fixed to a central portion of the case. The rotor rotates about the shaft within the case, and includes a rotor yoke, a magnet fixed to the rotor yoke, and a weight imparting eccentricity to the rotor. The printed circuit board is installed to a bottom surface of the case, and forms a coil hole in a region thereof facing the magnet. The plurality of coils passes through the coil hole and is installed on the bottom surface of the case.

8 Claims, 2 Drawing Sheets

SLIM TYPE VIBRATION MOTOR

CROSS-REFERENCE To RELATED APPLICATION

This application is the U.S. national stage application of International Patent Application No. PCT/KR2006/003858, filed Sep. 27, 2006, the disclosure of which is hereby incorporated by reference in its entirety.

TECHNICAL FIELD

The present invention relates to a printed circuit board (PCB) of a slim type vibration motor.

BACKGROUND ART

According to the recent trend of slimming and miniaturizing mobile communication terminals, vibration motors used in mobile communication terminals are required to have specifications including a 10.0 mm diameter and a 2.0 mm thickness.

FIG. 1 is a sectional view of a slim type vibration motor according to the related art, which will now be described.

As shown in FIG. 1, a conventional vibration motor 10 includes a yoke bracket 11 and a cover 13 that are coupled to form a predetermined space within, and a lower and upper portion of a shaft 15 are supported respectively by the yoke bracket 11 and the cover 13.

A stator base 17 is provided at the top surface of the yoke bracket 11, and a coil 19 is bonded to the top surface of the stator bracket 17. Also, a shaft receiving member 21 is provided around the shaft 15, and an eccentric rotor yoke 23 is fixed around the shaft receiving member 21. Magnets 25 and weights 27 are provided at the lower surface of the rotor yoke 23.

Thus, when a current is supplied to the coil 19, the coil 19 and magnet 25 interact so that the magnets 25, weights 27, and rotor yoke 23 rotate and generate vibrations.

Normal vibration motors have diameters of 10.0 mm and thicknesses of 2.6 mm, whereas slim type vibration motors have diameters of 10.0 mm and thicknesses of 2.0 mm. In order to form a slim type vibration motor, the thicknesses of the coil 19 and magnets 25 must be reduced.

However, in the slim type vibration motors according to the related art, when the coil 19 and magnets 25 are reduced in thickness, the ability to generate an adequate amount of torque is sacrificed. To increase the torque of a slim type vibration motor, the applied current can be increased; however, this consumes more power from the battery, reducing the time that the mobile communication terminal can be used on a single charge.

DISCLOSURE OF INVENTION

Technical Problem

The present invention provides a slim type vibration motor with a minimal size, that has low power consumption while generating an adequate amount of torque.

Technical Solution

To achieve these objects and advantages and in accordance with the purpose of the invention, as embodied and broadly described herein, there is provided a slim type vibration motor including: a case; a supporting shaft having at least one end thereof fixed to a central portion of the case; a rotor rotating about the supporting shaft within the case, including a rotor yoke, a magnet fixed to the rotor yoke, and a weight imparting eccentricity to the rotor; a printed circuit board installed to a bottom surface of the case, and forming a coil hole in a region thereof facing the magnet; and a plurality of coils passing through the coil hole and installed on the bottom surface of the case.

Advantageous Effects

An advantage of the slim type vibration motor according to the present invention is that it provides a coil that passes through a PCB and is fixed on the lower case. Therefore, an increase in the size of the slim type vibration motor can be minimized, while increasing the thickness of the coil by as much as the thickness of the PCB. That is, because the number of coil windings can be increased, it can generate an adequate amount of torque and reduce the amount of power consumed.

BEST MODE FOR CARRYING OUT THE INVENTION

Reference will now be made in detail to the preferred embodiments of the present invention, examples of which are illustrated in the accompanying drawings.

Figure 1:
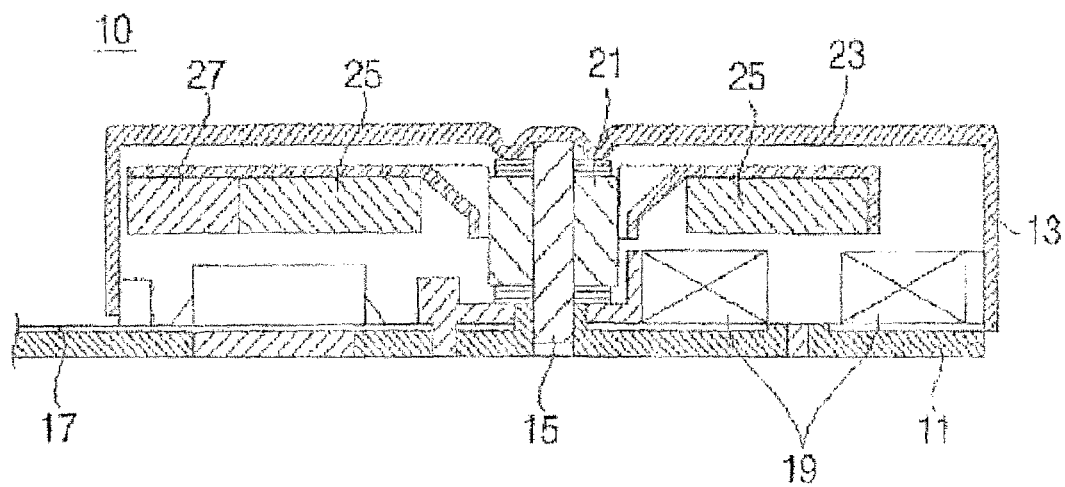
FIG. 1 is a sectional view of a slim type vibration motor according to the related art.
Figure 2:
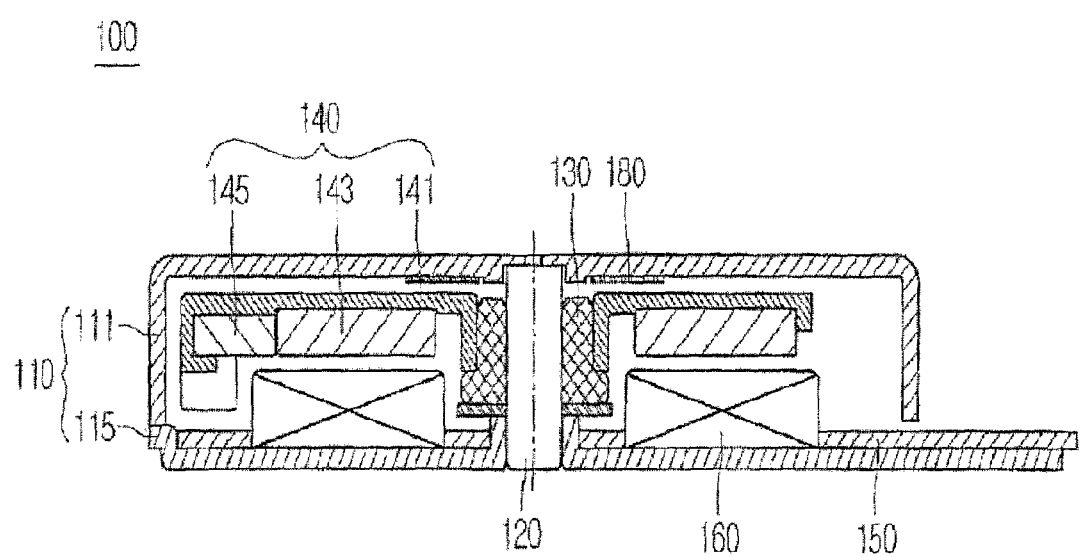
FIG. 2 is a sectional view of a slim type vibration motor according to an embodiment of the present invention.
Figure 3:
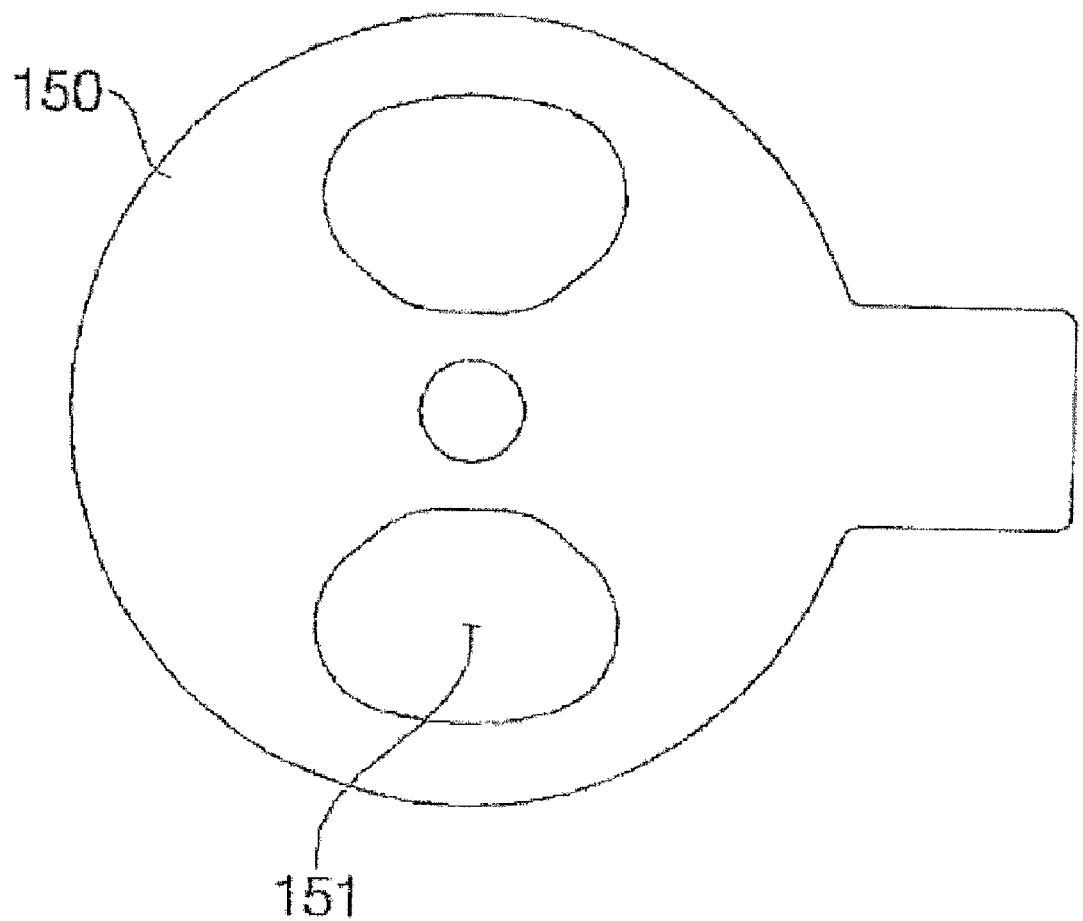
FIG. 3 is a plan view of a PCB of the motor in FIG. 2 without the components provided above the PCB.

FIG. 2 is a sectional view of a slim type vibration motor according to an embodiment of the present invention, and FIG. 3 is a plan view of a PCB of the motor in FIG. 2 without the components provided above the PCB.

Referring to FIG. 2, a case 110 includes an upper case 111 and a lower case 115 coupled together to form a predetermined space within. The upper case 111 and the lower case 115 support both ends of a supporting shaft 120.

A bearing 130 is inserted around the outer surface of the supporting shaft 120, and a rotor 140 is provided to rotate around the outer surface of the bearing 130. The rotor 140 is provided around the outside of the bearing 130, and has an eccentric rotor yoke 141 with a magnet 143 and a weight 145 fixed on the bottom surface of the rotor yoke 141. The weight 145 allows the rotor 140 to impart a large vibrating force.

The rotor yoke 141 is fixed directly to the bearing 130, ensuring convenience in assembly.

The upper surface of the upper case 111 has a washer 180 fixed thereto. The washer 180 prevents the rotor yoke 141 from colliding with the lower case 111, and absorbs shock in the event that a collision occurs. The washer 180 functions when the vibration motor is moved and the rotor 140 is moved. The washer 180 can especially increase operational reliability of the vibration motor when the rotor 140 is subjected to shocks while rotating at high speed.

A PCB with an integrated circuit (IC—not shown), a Hall element, etc., is fixed to the bottom surface of the lower case 115. Wound coils 160 for generating an electric field when a current is supplied thereto and rotating the rotor 140 is provided below the magnet 143. Here, the magnet 143 is a six-pole magnet.

The slim type vibration motor 100 according to the present embodiment increases the thickness of the wound coils 160 to increase torque output while reducing power consumption.

In further detail, a coil hole 151 is formed in a portion of the PCB 150 opposite the magnet 143, and the coil 160 is passed through the coil hole 151 and fixed on the lower case 115. The coil hole 151 may be formed symmetrically about the supporting shaft 120.

Here, to prevent the coil 160 from being displaced by the vibrations generated by the vibration motor and to fix it more securely, the coil 160 may be firmly adhered to the bottom surface of the lower case 115 using an adhesive. Another method is to use a double-sided adhesive tape to fix the coil 160.

Generally, the thickness of the magnet of a slim type vibration motor is 0.4-0.5 mm, the thickness of the coil is 0.5-0.6 mm, and the thickness of the PCB is 0.15-0.20 mm.

The coil 160 of the slim type vibration motor 100 according to the present invention, because it is passed through the PCB 150 and fixed to the lower case 115, can be increased by the thickness of the PCB 150. In other words, the number of wire windings of the coil 160 may be increased by an amount corresponding to the thickness of the PCB 150, increasing torque according to Equation 1 below.

$$T]ZsI=2NsI \qquad \text{Equation 1}$$

(T: torque, Z: no. of conductors, I: current, N: no. of coil windings)

Specifically, the slim type vibration motor 100 according to the present embodiment increases the number of windings in the coil 160 by the thickness of the PCB 150 to generate an adequate amount of torque while reducing power consumption.

Here, the coil 160 passes through the coil hole 151 and protrudes a predetermined height from the top surface of the PCB 150 so that the number of coil 160 windings can be increased.

As described above, the slim type vibration motor according to the present invention passes the coil through the PCB and fixes it on the lower case. Thus, an increase in the size of the slim type vibration motor can be minimized, and the thickness of the coil can be increased by the thickness of the PCB. That is, the number of wire windings can be increased to produce an adequate amount of torque while reducing power consumption.

Mode for the Invention

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

For example, although the coil has been described as being adhered to the lower case using an adhesive or double-sided tape, the coil may be attached to the lower case through an inserting structure.

INDUSTRIAL APPLICABILITY

The present invention optimally positions the coil, so that the thickness of the vibration motor can be reduced, the electric field intensity can be increased, more torque can be generated, and power consumption can be reduced.

The invention claimed is:

1. A slim type vibration motor comprising:
   a case:
   a shaft fixed at least one end thereof to a central portion of the case;
   a rotor rotating about the shaft within the case, including a rotor yoke, a magnet fixed to the rotor yoke, and a weight imparting eccentricity to the rotor;
   a printed circuit board installed to a bottom surface of the case, a plurality of coil holes penetrating the printed circuit board in a region thereof facing the magnet; and
   a plurality of coils passing through the plurality of coil holes and installed on the bottom surface of the case.

2. The slim type vibration motor according to claim 1, wherein the coil holes are formed to correspond in number with the coils.

3. The slim type vibration motor according to claim 1, wherein the coils are provided in duplicate, and the coil holes are symmetrically formed about the shaft.

4. The slim type vibration motor according to claim 1, wherein the coils are fixed to the bottom surface of the case rising an adhesive.

5. The slim type vibration motor according to claim 1, wherein the coils are fixed to the bottom surface of the case using double-sided adhesive tape.

6. The slim type vibration motor according to claim 1, wherein the magnet is a six-pole magnet.

7. The slim type vibration motor according to claim 1, wherein the case comprises a washer attached to an upper surface thereof.

8. The slim type vibration motor according to claim 1, further comprising a bearing provided between the rotor and the shaft, wherein the rotor yoke of the rotor is directly fixed to the bearing.

* * * * *